(12) United States Patent
Grant

(10) Patent No.: US 8,595,078 B2
(45) Date of Patent: Nov. 26, 2013

(54) METHOD FOR PROCESSING TELEPHONE ORDERS

(75) Inventors: Richard Grant, Davie, FL (US); Maureen Winter, legal representative, Davie, FL (US)

(73) Assignee: Maureen F. Winter, Langley, FL (US)

( * ) Notice: Subject to any disclaimer, the term of this patent is extended or adjusted under 35 U.S.C. 154(b) by 386 days.

(21) Appl. No.: 12/682,635

(22) PCT Filed: Oct. 14, 2008

(86) PCT No.: PCT/US2008/011736
§ 371 (c)(1),
(2), (4) Date: Sep. 17, 2010

(87) PCT Pub. No.: WO2009/048637
PCT Pub. Date: Apr. 16, 2009

(65) Prior Publication Data
US 2011/0093359 A1   Apr. 21, 2011

Related U.S. Application Data

(60) Provisional application No. 60/998,466, filed on Oct. 11, 2007.

(51) Int. Cl.
*G06Q 30/00* (2012.01)

(52) U.S. Cl.
USPC ....................................................... 705/26.1

(58) Field of Classification Search
USPC ................ 705/26.1, 26.2, 26.25, 26.3, 26.35, 705/26.4, 26.41–26.44, 26.5, 26.61–26.64, 705/26.7, 26.8, 26.81, 26.82, 26.9, 27.1, 705/27.2; 704/270, 246
See application file for complete search history.

(56) References Cited

U.S. PATENT DOCUMENTS

| 7,062,452 | B1 * | 6/2006 | Lotvin et al. | 705/14.4 |
| 7,877,296 | B2 * | 1/2011 | Sherwin et al. | 705/26.1 |
| 8,321,277 | B2 * | 11/2012 | Coulomb et al. | 705/14.44 |
| 2006/0178947 | A1 * | 8/2006 | Zsigmond et al. | 705/26 |
| 2009/0012704 | A1 * | 1/2009 | Franco et al. | 701/200 |
| 2009/0319272 | A1 * | 12/2009 | Coulomb et al. | 704/251 |

OTHER PUBLICATIONS

Min-Jen Tsai "The VoiceXML Dialog System for the E-Commerce Ordering Service", The 9th International Conference on Computer Supported Cooperative Work in Design, 2005, pp. 95-100, vol. 1, ISBN: 1-84600-002-5.*

* cited by examiner

*Primary Examiner* — Naeem Haq
(74) *Attorney, Agent, or Firm* — The Law Office of Roger S. Thompson

(57) ABSTRACT

A method for completing an order from a free-form input from a customer, such as by phone, SMS, IM or e-mail. The customer input has discrete components. The individually recognized components are compared to a list of predefined elements, and each possible predefined element present in the order is recognized and then put into a possible order. If all of the components necessary for a complete order are present in the input, either by being recognized or inferred, an order is established and complete. The completed order is passed on to the next stage in the process, whether it is shipping or assembling for satisfying the order.

10 Claims, 1 Drawing Sheet

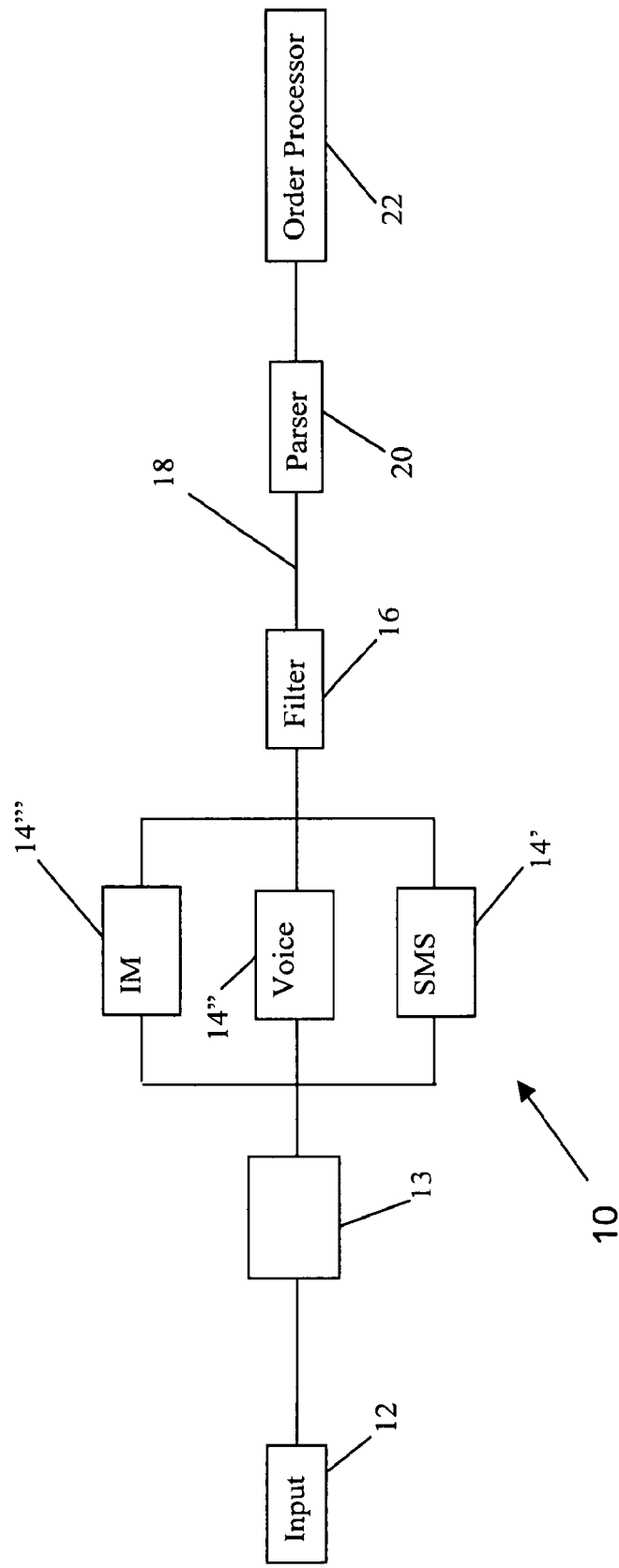

METHOD FOR PROCESSING TELEPHONE ORDERS

BACKGROUND OF THE INVENTION

1. Field of the Invention

This application is directed to the field of telephony-based applications for computer software, and, more particularly, to telephony-based order-taking software applications.

2. Description of the Related Art

Nearly all commerce at this point in time is driven by taking orders of one kind or another, whether it be taking an airplane reservation over the telephone or making a reservation for a doctor's appointment. It is a current trend in the art to automate the order taking procedure to the greatest extent possible. This has several benefits both to the consuming public and to the business that provides the goods or services being ordered. For example, for the consumer, automated telephony-based order taking would permit the user to place an order at his or her convenience at any time of the day or night. The business' needs are served by maximizing the potential for revenue by increasing the possibility of securing a new order. The businesses are also best served by removing, to the extent possible, the human order taker from the equation, since that is a large component of the cost of an order taking operation.

A first generation attempt to provide for automated order taking was a simple voice messaging system whereby people seeking to place an order or make an appointment would leave a message on an automated voice answering system, such as an answering machine, and request that an order be sent or that an appointment be made. This increased some opportunities for users to access the system for placing an order or making an appointment, but suffered from several drawbacks. First, in making a doctor's appointment, for example, if the physician with whom the appointment was being made did not have the particular time slot available, this method required repeated back-and forth telephone calls to establish the appointment. Similarly, for taking an order for tangible goods it would always would be possible that the supplier of the goods would be out of the particular goods that were ordered or would otherwise not be able to meet the delivery schedule requested by the ordering party. Thus, this system ultimately proved unsatisfactory.

A later generation of automated voice-ordering arrived with the advent of touch-tone dialing, via dual-tone multi frequency ("DTMF") telephony. It became possible to have an automated ordering system accessible through a touch pad of a telephone, so that a user could call up a system, and access the system over the telephone and "push one for . . . ." This provided a significant improvement over simple voice messaging technology but suffered from many of its own drawbacks. First, users were required to "drill down" to reach a desired option. While it would be possible to make a selection quickly if the user knew the available option on a particular menu, the user would still be required to go through individual menus to reach a desired selection. Secondly, it required the user to navigate through use of the touch pad of the phone rather simply through voice.

A later generation of responses allowed users to make selections through voice commands rather than through the key pad, so that the user could use the menu by speech rather through pressing the key pad. This provided an improved experience for the customer, and greater convenience for navigating the menus, but still required following drill-down menus.

Currently, the technology has evolved to permit the use of "directed dialog" grammars. This means that a current system may have voice prompts, such as, for example: "are you having a billing or reception problem" (for a cable company). In response, the user is directed to make a selection for one or more (possibly free-form) answers. The key, however, is that the user is only provided a limited number of options to choose from, whether expressly or implicitly provided.

This suffers from the drawback of providing a user experience which is not necessarily a pleasant one. There would be a benefit to having a user-ordering experience which more closely approximates the interaction of placing an order with a live human, such as waiter or operator, without the expense of having human personnel.

There is thus a need in the art for a method and system for accepting orders that enhances the user experience and at the same time lowers the cost of the development and maintenance of the order taking system.

SUMMARY OF THE INVENTION

It is therefore an object of the invention to provide an improved order taking method which overcomes the drawbacks of the prior art.

More specifically, it is an object of the invention to provide an order taking system which accepts free-form orders from a consumer without the need to direct the user through a directed-dialog ordering system.

It is yet another object of the invention to provide unique identifiers for various difference valid orders so that an order may be recognized as a valid order regardless of the sequence in which individual components of the order may be received.

Briefly stated, the invention is directed to a method for completing an order from a customer, where the method comprises the steps of receiving an input having discrete elements from the customers; comparing the received elements with a database of recognized elements; determining if each received element is a recognized element; collecting the recognized elements in the input to form a potential order; comparing the recognized elements in the potential order with lists of elements in predefined elements; determining if each recognized elements is found in a list of elements and, if so, in which list(s) it is found; identifying all categories of elements in which recognized elements contained in a single potential order fall; comparing the identified categories of elements with a list of predetermined categories of elements to determine if at least one element from each of said predetermined categories is found in the potential order; and accepting the potential order if it includes at least one element in at least the predetermined categories.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described with reference to the accompanying drawing in which:

FIG. 1 is a schematic diagram of a system for processing orders in accordance with the invention.

DETAILED DESCRIPTION OF THE PRESENTLY PREFERRED EMBODIMENTS

There is a shown, generally at 10 in FIG. 1, a system in accordance with the invention. System 10 includes an input module 12 which receives an input from a customer. The input may be in the form of a telephone communication such as a voice input, or may be a data input such as a text message, an SMS (short message service) or an Instant Message ("IM"). The input as received by module 10 is directed to a switch 13 which identifies the nature of the input and relays the input to a suitable processor 14 specific for the type of input received. For example, a first processor 14' may be dedicated to receive a text message while a second processor 14" may be dedicated to receive a voice input. For purposes of the following description it is preferred that the input be a voice input received by telephone, and the following description will be directed to this embodiment. It will be understood by one of ordinary skill in the art, however, that this is not a limitation on the invention but merely as an exemplary embodiment thereof to facilitate an understanding of the invention.

Processor 14" is a standard voice recognition engine, such as manufactured and produced by Nuance, Microsoft or IBM (the latter under the trademark Via Voice). In the most preferred embodiment of the invention, the engine is the Microsoft Office Communicator Server 2007. Processor 14 receives the voice input from the user as an analog audio stream. The analog audio stream between any two major breaks in the stream is referred to as an "utterance". Processor 14 breaks the utterance into smaller portions identified within the stream of audio input, defined as the analog signal between two smaller pauses. The voice recognition engine will attempt to identify the individual sounds of these smaller portions as words. The process proceeds in known fashion to identify the input utterance as a stream of recognized words or unrecognized sounds.

Downstream of processor 14 is a filter 16. Filter 16 receives the stream of recognized words from processor 14 and permits passage therethrough of only those words that are selectively recognized by the system as being useful in a particular application. By way of example, and not limitation, in the context of placing an order with a pizza only restaurant, the permitted words would include a list of toppings (e.g., mushrooms, pepperoni, onion, anchovies) a quantity (1, 2, 3, etc.) and a size (small, medium, large). It would be appreciated by those of ordinary skill in the art that these itemized words are not the exclusive words which may be necessary to order a pizza. For example, certain stores may have special names for pizza containing specific combination of toppings ("meatlovers pizza") or special sizes ("super jumbo giganto"). One of ordinary skill in the art would readily understand how to modify the following description to take into account specific words that may be necessary for a particular application without undue experimentation.

One of ordinary skill in the art would likewise appreciate that filter 16 may also be located within processor 14, to enable only the passage therethrough of acceptable words so as to combine the functions of processor 14 and filter 16. The selection of the specific orientation of these two components is well within the knowledge of one of ordinary skill in the art.

Filter 16 permits the passage of only those words which are recognized by filter 16 as making up the potential lists of commands which would be considered acceptable to place an order within the specific system. Also by way of example, filter 16 may block the passage of words which, although they may be perfectly acceptable English words, such as "squirrel" or "granite", that nonetheless are unlikely to be found in the context of a pizza order.

Thus, the output of the combination of processor 14 and filter 16 is a stream of words 18 that make up a potential order for pizza.

Stream 18 is then passed to a parser 20. Parser 20 looks for commands in stream 18 that make up a valid order, and determines if the minimum criteria for a valid order are received. Specifically, in the context of a pizza order, a valid order would consist of three components: how many pizzas are to be ordered, what size those pizzas are and what toppings are to be included on the pizzas. Certain elements may be inferred if there are no specific words used to place the order. For example, a total absence of recited toppings would infer that the user intended to order a "plain" pizza or a cheese pizza with no toppings. Similarly, if no specific number is recited, the parser will infer that the user intended to order a single pizza of the specified variety. In practice, therefore, the command string "a large pizza" would be interpreted to mean that the user intended to order one large plain cheese pizza.

Parser 20, with the inferences, determines if the minimum criteria for an order is placed, namely that the size, amount and variety of the pizza are specified. If these three elements are present in the order string, either by specific inclusion or by inference, then parser 20 determines that an order has been correctly placed. If the minimum criteria are met, parser 20 sends a command to an order processor 22 identifying the presence of a valid order and the commands which make up that order. Order processor 22 then determines the nature of the order.

Previously, problems arose in the automated processing of a telephone order because the user may not have followed a predetermined pattern for placing the order. For example the user may state "gimme a large with mushrooms" which would have the same intended result as "I'd like one mushroom, make it a large". This problem is compounded when an order included multiple toppings where, for example, "one large mushroom, pepperoni and onion pizza" is the same pizza as "one large onion, mushroom, pepperoni pizza". Traditional grammar-based parsers would recognize these two pizzas as different and so prior art parsers would have had to recognize every possible permutation of combinations of pizzas to process a free-form order. In the case of an average pizza restaurant where any pizza ordered may have any four or more toppings, selected from a group of 15 or more potential toppings the possible permutations are staggering.

According to the invention, however, each pizza may be identified as identical to others with the same toppings regardless of the sequence in which the topping are enunciated by the user. This is accomplished by the following procedure.

Each possible topping is assigned a unique numerical identifier compared to the other potential toppings. The identifiers are selected so that no combination of the toppings will yield the same number. Therefore, the addition of the numerical identifiers will be the same, regardless of the sequence in which they are spoken. Due to the commutative principle of mathematics, the order of the addition is irrelevant to the result of the addition. In this fashion, therefore, ordering a pizza with the toppings "pepperoni, mushroom and onion" will yield the same results as ordering a pizza with the toppings "onion, mushroom and pepperoni". According to the preferred embodiment of the invention, the numerical values to each topping are determined by the consonants in the word. Each letter of the alphabet is assigned a number in ascending order, so that a=1, b=2, etc. and the various letter values present in a single word are added together. According to the most preferred embodiment of the invention, only the consonants are selected to keep the numbers being processed more manageable. For example, peppers would include three times the value of p plus the value of r and the value of s. Pepperoni would include three times the value of p the value of r and the value of n. These values are 66 and 76, respectively. In this fashion, the numerical value associated with each common topping is unique and found within a defined range of value. Other methods of selecting unique numerical identifiers such as some combination of prime numbers, may also work. One of ordinary skill in the art would be able to determine what values would work for any given application considering the specific toppings that may be available at any given location.

In this fashion, a unique identifier may be assigned to each possible combination of pizza toppings no matter the sequence in which the toppings are enunciated by the user and so order processor 22 would have a simple search to perform. Thus, processing time is much shorter compared to prior grammar-based applications which would have to process each possible combination independently and compare all of the possible available permutation of toppings. Even with today's fast processors, this could be a daunting task.

Furthermore, in the preferred embodiment, the size of the pizza should also be associated with a unique identifier which, in combination with any permutation of toppings, will also result in a unique identifier so that each unique size and combination of toppings is assigned its own unique identifier represented by the sum of the individual components and size. In this embodiment, the numbers assigned to small, medium and large are 27, 30 and 33, respectively.

Accordingly, according to the preferred embodiment, order processor 22 will assign a numerical value to each possible permutation of size and toppings, regardless of the order they are spoken, so that the output of order processor 22 is a unique identifier which will uniquely identify the size and toppings for any particular pizza.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for completing an order from a customer using a computer which includes a database of recognized elements in predetermined categories, and a memory, the method comprising the steps of:
receiving an input in said computer, said input having discrete elements;
comparing the received elements with the elements stored in said database of recognized elements;
determining if each received element is one of said recognized elements in said database of recognized elements;
collecting the recognized elements in the input to form a potential order, said collecting occurring in the memory in the computer;
comparing the recognized elements in the potential order with at least one list of elements in one of the predefined categories, said at least one list of elements in one of the predefined categories being stored in the memory;
determining if each recognized element is found in said at least one list of elements;
identifying all categories of elements in which recognized elements contained in a single potential order lie;
creating a unique identifier for each possible combination of elements;
comparing the identified categories of elements with a list of predetermined categories of elements stored in the memory to determine if at least one element from each of said predetermined categories is found in the potential order; and
accepting an order if said potential order includes at least one element in each of at least the predetermined categories of elements.

2. The method of claim 1, further comprising the step of inferring the presence of an element on a list by the context of the potential order, and accepting the order based on the inferred element.

3. The method of claim 1 further comprising the step of confirming the order with the customer.

4. The method of claim 1, further comprising the step of relaying the order to a processing department.

5. The method of claim 1 in which said at least one list of elements includes at least two lists of elements and further comprising the step of determining in which list said received element falls.

6. The method of claim 1, wherein the computer is a general purpose computer.

7. A method for completing an order from a customer using a computer which includes a database of recognized elements in predetermined categories, and a memory, the method comprising the steps of:
receiving an input in said computer, said input having discrete elements;
comparing the received elements with the elements stored in said database of recognized elements;
determining if each received element is one of said recognized elements in said database of recognized elements;
collecting the recognized elements in the input to form a potential order, said collecting occurring in the memory in the computer;
comparing the recognized elements in the potential order with at least one list of elements in one of the predefined categories, said at least one list of elements in one of the predefined categories being stored in the memory;
determining if each recognized element is found in said at least one list of elements;
identifying all categories of elements in which recognized elements contained in a single potential order lie;
creating unique identifiers for individual components of an order;
comparing the identified categories of elements with a list of predetermined categories of elements stored in the memory to determine if at least one element from each of said predetermined categories is found in the potential order; and
accepting an order if said potential order includes at least one element in each of at least the predetermined categories of elements.

8. The method of claim 7, further comprising the step of gathering each individual unique identifier of each individual element of an order to create a unique identifier for each unique type of order.

9. The method of claim 8, wherein said individual unique identifiers are numerical, and said step of gathering includes summing said individual unique identifiers to form said unique identifier of an order.

10. A method for completing an order from a customer using a computer which includes a database of recognized elements in predetermined categories, and a memory, wherein the input is a voice command, and the method comprises the steps of:

receiving the voice command input in said computer, said voice command input having discrete elements;

using a voice recognition engine to translate the received voice command input to a digital pattern for recognition of the received discrete elements thereof by the computer;

comparing said recognized discrete elements with the elements stored in said database of recognized elements;

determining if each received discrete element is one of said recognized elements in said database of recognized elements;

collecting the recognized elements in the input to form a potential order, said collecting occurring in the memory in the computer;

comparing the recognized elements in the potential order with at least one list of elements in one of the predefined categories, said at least one list of elements in one of the predefined categories being stored in the memory;

determining if each recognized element is found in said at least one list of elements;

identifying all categories of elements in which recognized elements contained in a single potential order lie;

comparing the identified categories of elements with a list of predetermined categories of elements stored in the memory to determine if at least one element from each of said predetermined categories is found in the potential order; and accepting an order if said potential order includes at least one element in each of at least the predetermined categories of elements.

* * * * *